US009273482B2

(12) United States Patent
Charlier et al.

(10) Patent No.: US 9,273,482 B2
(45) Date of Patent: Mar. 1, 2016

(54) ASSEMBLY PROCESS FOR A VEHICLE AND ASSEMBLY EQUIPMENT THAT IMPLEMENTS SUCH A PROCESS

(75) Inventors: Dominique Charlier, Bourg de Thizy (FR); Henri Laurent, Mably (FR); Stéphane Viganne, Renaison (FR); Guillaume Valette, Roanne (FR)

(73) Assignee: NEXTER SYSTEMS, Roanne (FR)

( * ) Notice: Subject to any disclaimer, the term of this patent is extended or adjusted under 35 U.S.C. 154(b) by 1496 days.

(21) Appl. No.: 12/385,057

(22) Filed: Mar. 30, 2009

(65) Prior Publication Data

US 2009/0265911 A1 Oct. 29, 2009

(30) Foreign Application Priority Data

Apr. 23, 2008 (FR) ..................................... 08 02279

(51) Int. Cl.
| B23P 11/00 | (2006.01) |
| E04H 6/18 | (2006.01) |
| E04H 6/12 | (2006.01) |
| B62D 65/18 | (2006.01) |
| E04H 5/06 | (2006.01) |

(52) U.S. Cl.
CPC ............... *E04H 6/188* (2013.01); *B62D 65/18* (2013.01); *E04H 5/06* (2013.01); *E04H 6/12* (2013.01); *E04H 6/18* (2013.01); *Y10T 29/49826* (2015.01); *Y10T 29/53983* (2015.01)

(58) Field of Classification Search
CPC ............. E04H 6/18; E04H 6/188; E04H 6/12; E04H 5/06; B62D 65/18; Y10T 29/53983; Y10T 29/49826

USPC ............ 29/897.2, 281.1, 281.4, 281.5, 281.6, 29/428, 802, 822, 823, 824; 414/814, 816, 414/234, 235, 240, 241, 252, 258, 678; 254/89 R

See application file for complete search history.

(56) References Cited

U.S. PATENT DOCUMENTS

| 1,410,103 | A | * | 3/1922 | Lightner et al. ............... 254/2 R |
| 1,722,818 | A | * | 7/1929 | Mugler ............................ 104/48 |
| 1,816,053 | A | * | 7/1931 | McGavin ...................... 414/240 |
| 2,655,115 | A | * | 10/1953 | Holdeman et al. ........... 104/32.1 |
| 3,734,466 | A | * | 5/1973 | Mason ........................ 254/89 R |
| 4,295,427 | A | * | 10/1981 | Waterman et al. ........... 104/32.1 |
| 4,645,412 | A |  | 2/1987 | Fujita et al. |
| 4,787,801 | A | * | 11/1988 | Ahlsen et al. ............. 414/222.03 |
| 5,052,520 | A | * | 10/1991 | Wakamiya ................... 187/219 |
| 5,636,711 | A | * | 6/1997 | Nussbaum .................... 187/211 |
| 5,701,706 | A | * | 12/1997 | Kreysler et al. .............. 52/169.6 |
| 5,738,160 | A | * | 4/1998 | Rice ........................... 160/84.06 |
| 6,189,272 | B1 | * | 2/2001 | Deiss et al. ................... 52/236.3 |
| 6,446,481 | B1 | * | 9/2002 | Ballard et al. .................. 72/446 |
| 7,874,057 | B1 | * | 1/2011 | Rickards ........................ 29/430 |

FOREIGN PATENT DOCUMENTS

| WO | WO 02/051695 A1 | 7/2002 |
| WO | WO 2006/128241 A1 | 12/2006 |

* cited by examiner

*Primary Examiner* — Ryan J Walters
(74) *Attorney, Agent, or Firm* — Oliff PLC

(57) ABSTRACT

An assembly process for a vehicle of substantial height, process in which at least one pit is implemented that is able to accommodate the vehicle, the latter being positioned on at least one removable floor platform able to raise the vehicle with respect to the bottom of the pit, the floor platform being positioned at the required height by means of positioning means.

15 Claims, 5 Drawing Sheets

ASSEMBLY PROCESS FOR A VEHICLE AND ASSEMBLY EQUIPMENT THAT IMPLEMENTS SUCH A PROCESS

BACKGROUND OF THE INVENTION

1. Field of Invention

The technical scope of the invention is that of vehicle assembly processes and in particular processes to assemble large-sized vehicles such as armored vehicles.

2. Description of Related Art

It is known to assemble vehicles, and in particular automobiles, by setting up an assembly line formed of several successive assembly stations. Known assembly lines comprise a traffic lane for vehicles on either side of which tooling is positioned that is more or less automated (welding robots, gantry cranes, . . . ).

Known assembly lines are well adapted to the assembly on an industrial scale of light vehicles but are not adapted to the assembly of large-sized vehicles and in particularly to armored vehicles.

The specificity of such vehicles lies in that they are often of considerable size (height of more than 2 meters) and their mass is also considerable being of over 5 tons.

Furthermore, these vehicles require the mounting of numerous pieces of often heavy equipment that is positioned at different heights.

The classical solution implemented in workshops is to set up removable walkways around the vehicle. These walkways provide access to the raised parts and they incorporate access steps.

In addition to the time required to set them up, these walkways present the disadvantage of generating a difference in level between the storage area for the parts and the assembly zone.

Furthermore, the risks are all the greater in that the operators are working at height and are obliged to frequently travel to and fro on the steps, often carrying heavy loads.

SUMMARY OF THE INVENTION

The aim of the invention is to propose a process and assembly equipment that facilitates and makes safer the assembly operations for a large-sized vehicle and in particular for an armored vehicle.

Thus, the invention relates to an assembly process for a vehicle of substantial height, process in which at least one pit is implemented that is able to accommodate the vehicle, the latter being positioned on at least one removable floor platform able to raise the vehicle with respect to the bottom of the pit, the floor platform being positioned at the required height by means of positioning means.

The vehicle may be put into place in the pit and on its floor platforms using lifting means.

According to a variant of this process, at least one assembly operation may be planned that is performed on a vehicle positioned upside down in a pit.

According to one variant, the vehicle may advance through the pit using its own mobility means, at least one ramp being provided to enable the vehicle to be removed from the pit.

The invention also relates to assembly equipment for a vehicle that implements such a process, such equipment comprising at least one pit able to accommodate the vehicle, pit inside which at least one floor platform is positioned able to raise the vehicle with respect to the pit bottom, the floor platform being removable and position at the required height using positioning means.

The assembly equipment may comprise at least two separate floor platforms, each floor platform being put into place such as to receive part of the vehicle's mobility means.

The floor platform and the positioning means may be constituted by a stack of stringers.

The pit may be of a length such that it is able to accommodate only one vehicle.

The pit may be of a length such that it is able to accommodate several vehicles, thereby constituting a pathway on which the vehicle(s) are able to circulate, at least one ramp being provided to enable the vehicle(s) to exit the pit.

The assembly equipment may, additionally, incorporate panels that may be positioned to the fore and/or the rear of the vehicle, such panels partly blocking the pit.

The assembly equipment may also incorporate lateral shutters enabling the gaps between the vehicle and the lateral edges of the pit to be closed off.

In this case, advantageously, each lateral shutter may incorporate a pivoting slat integral with a horizontal slat, such pivoting slat being able to press on the vehicle.

BRIEF DESCRIPTION OF THE DRAWINGS

The invention will become more apparent from the following description of particular embodiments, such description being made with reference to the appended drawings, in which.

DETAILED DESCRIPTION OF PREFERRED EMBODIMENTS

Figure 1:
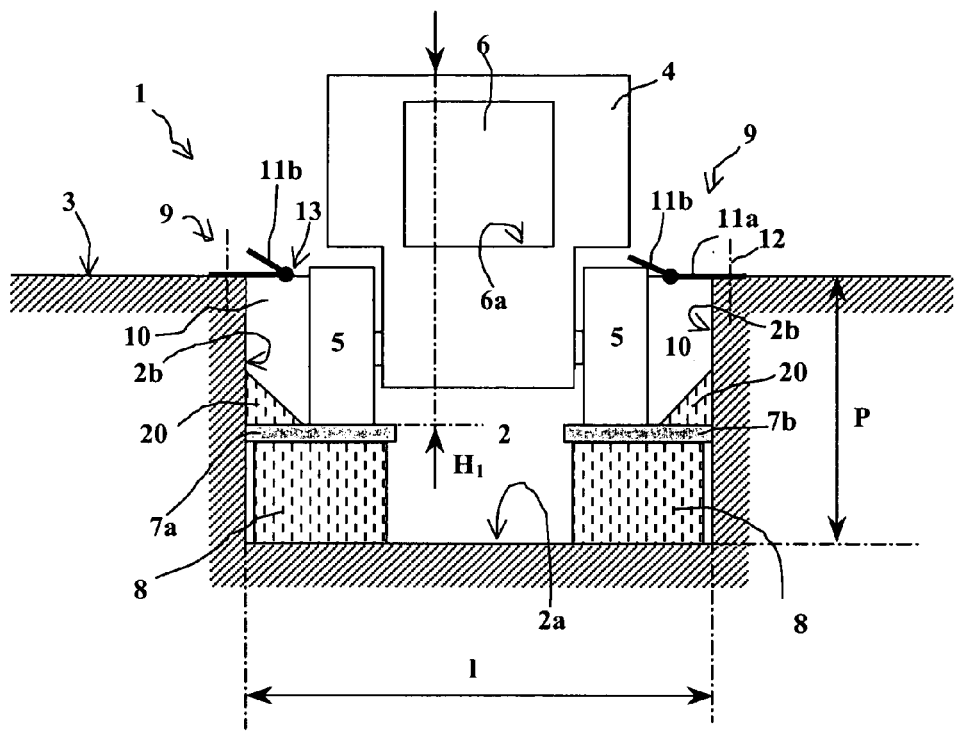
FIG. 1 schematically shows a cross section of assembly equipment according to the invention, equipment in which a first type of vehicle is positioned.
Figure 2:
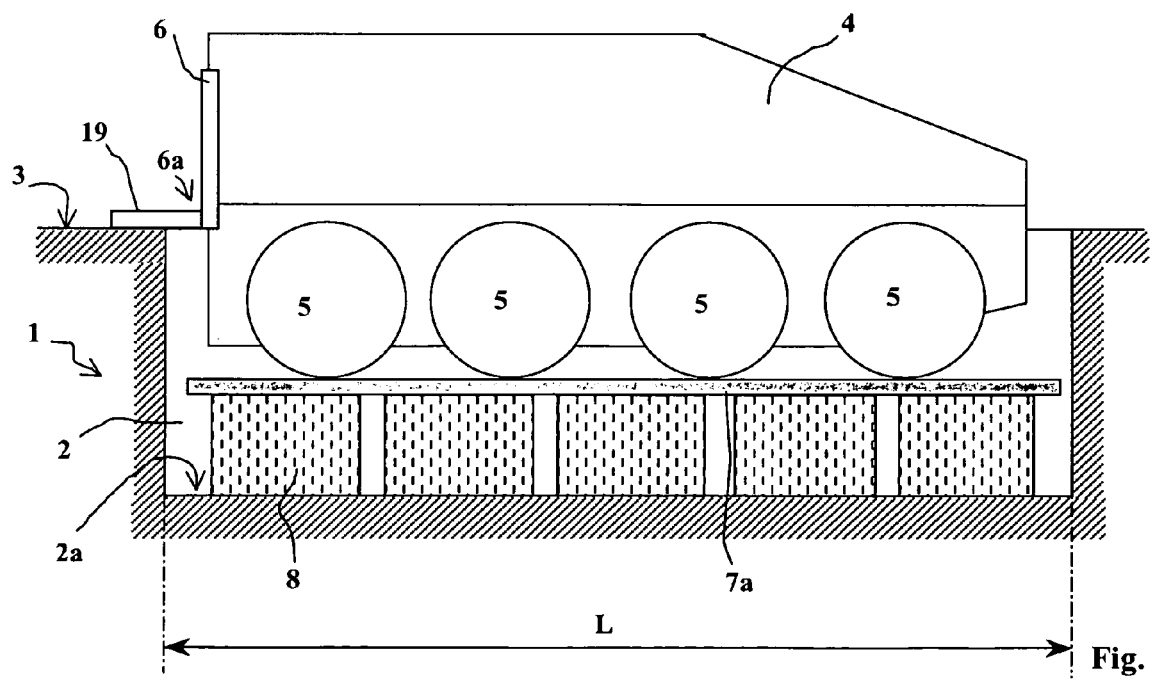
FIG. 2 is a longitudinal section of the same equipment.

With reference to FIGS. 1 and 2, assembly equipment 1 according to the invention comprises a brick-built pit 2 which is arranged in the floor 3 of a workshop. This pit is rectangular, has a depth P, a length L and a width 1.

The pit 2 is intended to accommodate a vehicle 4, here an armored infantry vehicle incorporating four pairs of wheels 5. Such a vehicle has a height $H_1$ that is particularly high (over 2 meters). At its rear part it incorporates a door 6 providing access to the cab.

So as to facilitate the different assembly operations, it is necessary for the door 6 to be positioned with its lower edge 6a substantially opposite the floor 3 of the workshop.

Thus, the operators may easily enter and exit the vehicle 4 directly from the floor 3 without it being necessary for a walkway or steps to be set up.

For this, the equipment according to the invention incorporates at least one floor platform 7 which enables the vehicle 4 to be raised with respect to the bottom 2a of the pit 2.

Here, two floor platforms are provided (7a and 7b), one for each row of wheels 5.

These floor platforms 7a, 7b are positioned at the required height using positioning means 8 which are constituted by blocks, made of wood for example. Lateral wedges 20 guide and centre the vehicle body as it is being put into place in the pit 2 using lifting means. These wedges are made, for example, of wood.

The floor platform 7a, 7b can naturally be dismounted and removed and the blocks 8 may be replaced by blocks of different sizes namely to position the vehicle 4 at a different height with respect to the floor 3 or else so as to adapt the equipment 1 to another vehicle of different dimensions.

As may be seen more particularly in FIG. 1, the equipment 1 incorporates lateral shutters 9 which enable the gaps 10 separating the vehicle for the lateral edges 2b of the pit 2 to be closed off.

Each lateral shutter 9 incorporates a fixed horizontal slat 11a which is made integral with the floor 3 of the workshop by attachment means (for example, screws, of which only a shaft 12 is shown in FIG. 1).

The lateral shutter 9 also incorporates a pivoting slat 11b made integral with the fixed slat 11a by a hinge 13. Slats 11a, 11b are, for example, made of metal.

The pivoting slat 11b may press against the vehicle 4 (here level with the wheels 5).

By blocking the gaps 10, the shutters 9 enable the operations performed around the vehicle 4 to be secured. They prevent the operators from catching a foot in the space 10 and also prevent any tools from falling into the bottom of the pit 2.

The presence of the pivoting slat 11b furthermore enables the shutters 9 to be adapted to different widths of the vehicles.

Figure 3A:
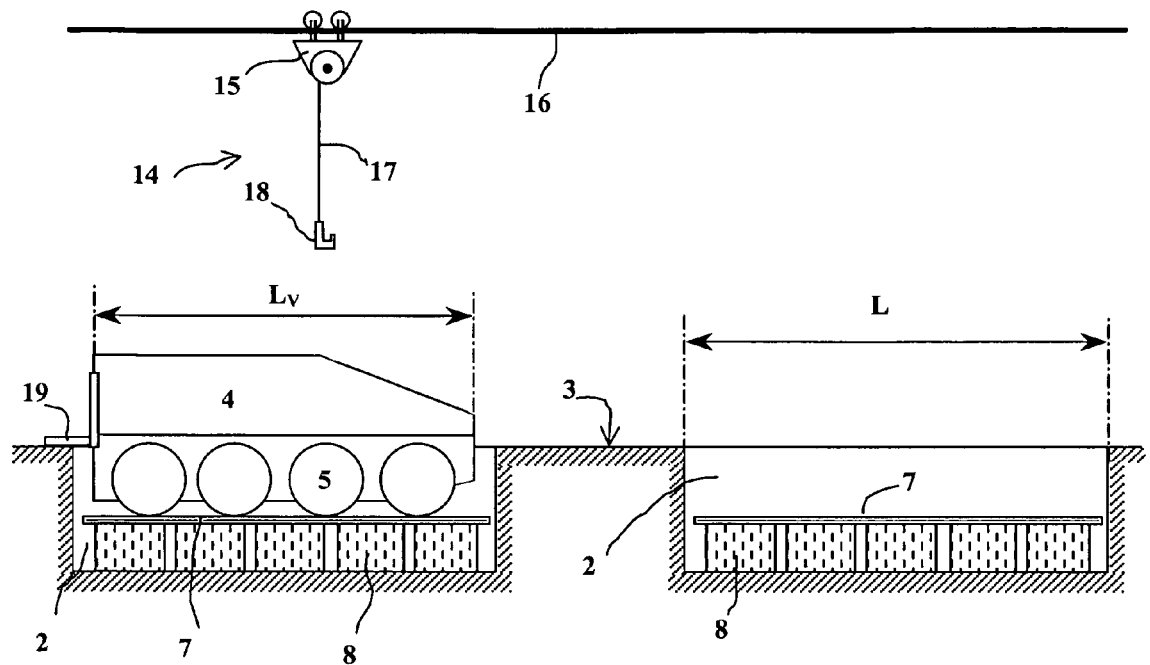
FIG. 3a shows a section view of an assembly facility implementing a first embodiment of the equipment according to the invention.
Figure 3B:
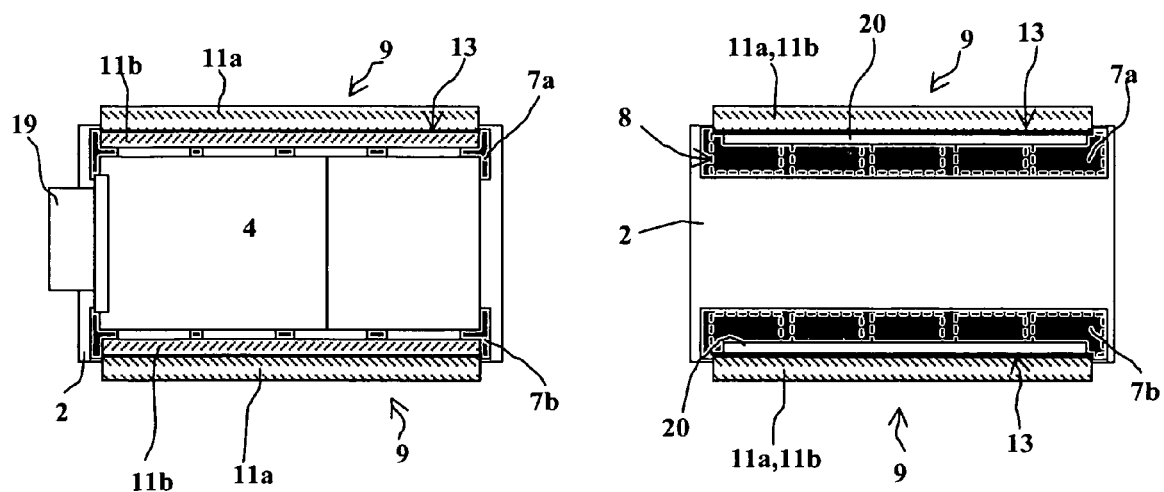
FIG. 3b is a top view of the facility according to FIG. 3a, FIGS. 4a, 4b, and 4c show an assembly facility implementing a second embodiment of the equipment according to the invention, FIG. 4a being a section view of a first end of the facility, FIG. 4b being a top view of this facility and FIG. 4c being a section view of a second end of the facility.

FIGS. 3a and 3b show an assembly facility implementing a first embodiment of the equipment according to the invention.

According to this embodiment, the workshop incorporates several pits 2 whose lengths L are greater than the total length Lv of the vehicle 4 but each pit 2 is only able to accommodate a single vehicle. A length L will naturally be chosen that is greater than the greatest length of the vehicles which are to be assembled in this workshop.

Here, only two pits 2 are shown, but the workshop may naturally incorporate a greater number of pits to increase its assembly capacity.

According to this embodiment of the assembly process, a vehicle 4 is put into place in the pit 2 on its floor platforms 7a, 7b using lifting means 14 comprising, for example, a hoist or bridge crane 15 able to slide along rails 16 close to the workshop roof. The hoist 15 unwinds a cable 17 to which a hook 18 is attached. Slings, not shown, are fastened to the vehicle 4 to enable it to be carried by the hoist 15.

The advantage of this embodiment lies in that the different pits 2 are separated by strips of floor 3 on which the different means to transport the parts (motorized trucks) are able to circulate in safety.

An access means 19 will be fixed (or laid) on the floor 3 to the rear of the vehicle 4 to facilitate entry to the vehicle and to cover the space between the pit 2 and the vehicle 4.

FIG. 3b gives a top view of the lateral shutters 9. On the left part of this Figure, a vehicle 4 is positioned on the floor platforms 7a, 7b. The pivoting slats 11b of the shutters 9 are applied against the wheels of the vehicle thereby ensuring the lateral gaps are closed off.

On the right of this FIG. 3b, the pit 2 does not contain a vehicle. The shutters 9 are in their folded position, the pivoting slats 11b pressing on the fixed slats 11a. It is therefore possible for a vehicle to be introduced into the pit without being hindered by the shutters 9.

This part of the Figure also shows the floor platforms 7a and 7b, as well as their positioning blocks 8 in the background.

Figure 4A:
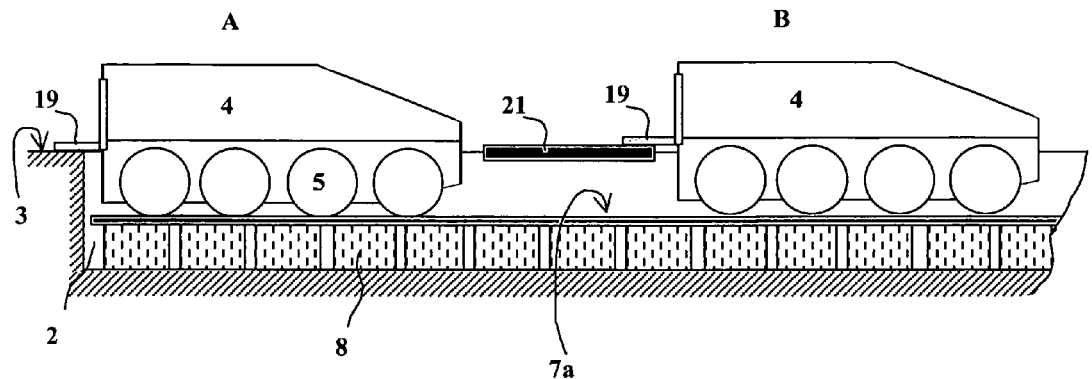
Figure 4B:
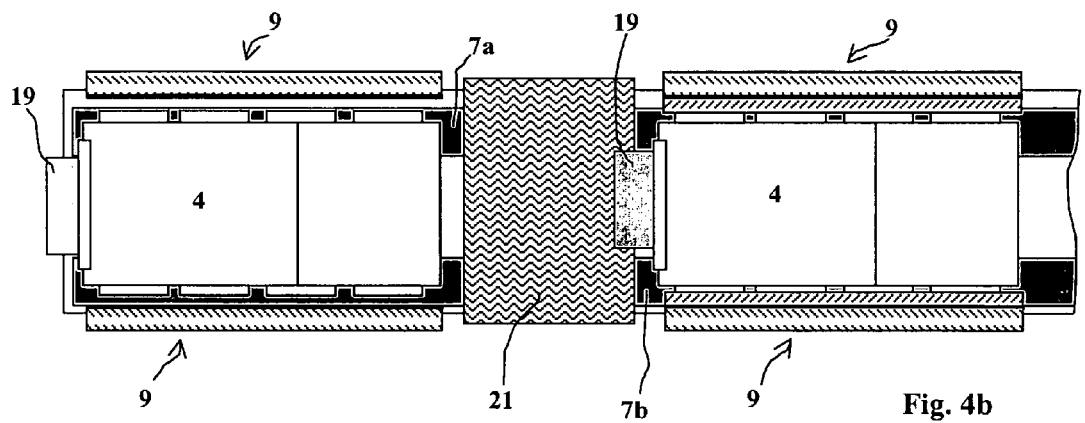
Figure 4C:
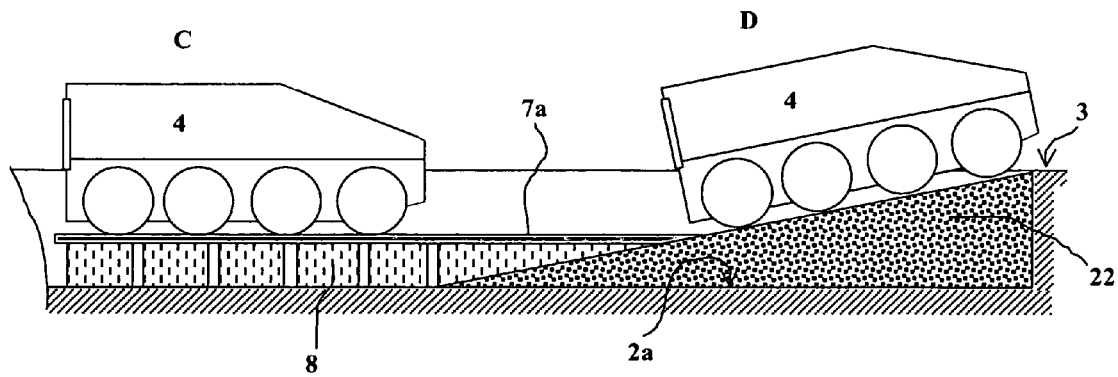

FIGS. 4a, 4b and 4c show an assembly facility that implements a second embodiment of the equipment according to the invention. According to this embodiment, the workshop incorporates at least one pit 2 whose length L is well over the total length Lv of the vehicle 4.

This pit may thus accommodate several vehicles. Several workstations A, B, C, may thus be delimited in the workshop. Each workstation may be dedicated to certain assemblies. The vehicles will move from one assembly station to another along the floor platforms 7a, 7b.

The pit 2 thus constitutes a pathway upon which the vehicles 4 are able to circulate.

So as to enable the different assemblies to be carried out at each workstation, panels 21 will be positioned between the different vehicles 4 intended to partly block off the pit 2. These panels will be made of metal sheeting with high mechanical strength to enable the passage of handling equipment. They will be removed using a hoist before each advance movement of the vehicles 4 and then repositioned thereafter.

FIGS. 4a and 4b also show the access means 19 which facilitate the entry to the inside of each vehicle, either from the floor 3 of the workshop or from a panel 21.

According to this embodiment of the invention, means may also be provided that enable the vehicles to drive independently out of the pit 2.

FIG. 4c shows this form of exiting of a vehicle 4 at workstation D. The means enabling such an exit are constituted by a ramp 22 (or else two ramps, one for each floor platform 7a, 7b). Ramp 22 will be advantageously made of concrete and will be positioned at the bottom 2a of the pit 2. Depending on the height of the positioning means 8, the floor platforms 7a, 7b with reach a greater or lesser height on the ramp 22.

By way of a variant, other intermediate ramps (not shown) may be provided which will be positioned, for example, between two successive workstations. It would thus be possible to obtain two different working heights for a same vehicle. This may prove advantageous for the assembly of particularly complex vehicles.

Whatever the embodiment implemented one of the advantages of the process and the assembly equipment according to the invention lies in that it enables the workshop to be adapted to the assembly of vehicle with different dimensions.

Figure 5:
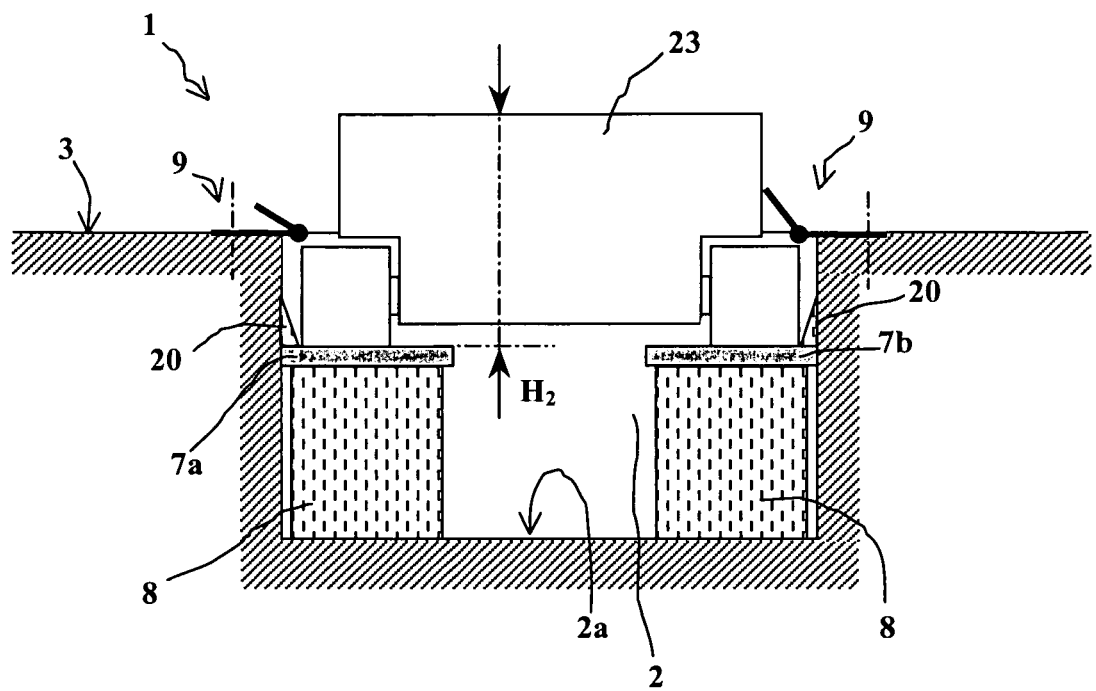
FIG. 5 is an analogous view to that of FIG. 1 but in which a second type of vehicle is positioned in the equipment.

FIG. 5 thus shows the same pit 2 inside which a vehicle 23 of different dimensions has been positioned. This vehicle is here a tracked vehicle whose height H2 is less than the height H1 of the vehicle 4 previously described.

It is thus necessary for the vehicle 23 to be positioned in the pit 2 at a greater height. This result is obtained by implementing positioning means 8 of different heights. The dimensions of the wedges 20 are also selected so as to be adapted to this new type of vehicle.

The lateral shutters 9 may, in addition, be moved or replaced so as to enable a wider vehicle to be put in position.

We can thus see that the assembly process and equipment according to the invention not only enable the assembly of heavy and cumbersome vehicles to be made easier and safer but also enable an adaptation to the assembly of different types of vehicle.

For this, the wedges and perhaps the floor platforms merely have to be changed in order to move from the assembly of one type of vehicle to another.

Naturally, the modularity of this equipment is only possible to a certain extent as determined by the different dimensions selected for the pit (depth, width, and possibly length).

However, with the judicious selection of the dimensions of the pit, it is thus possible to perform the assembly of a great number of different vehicles.

Figure 6:
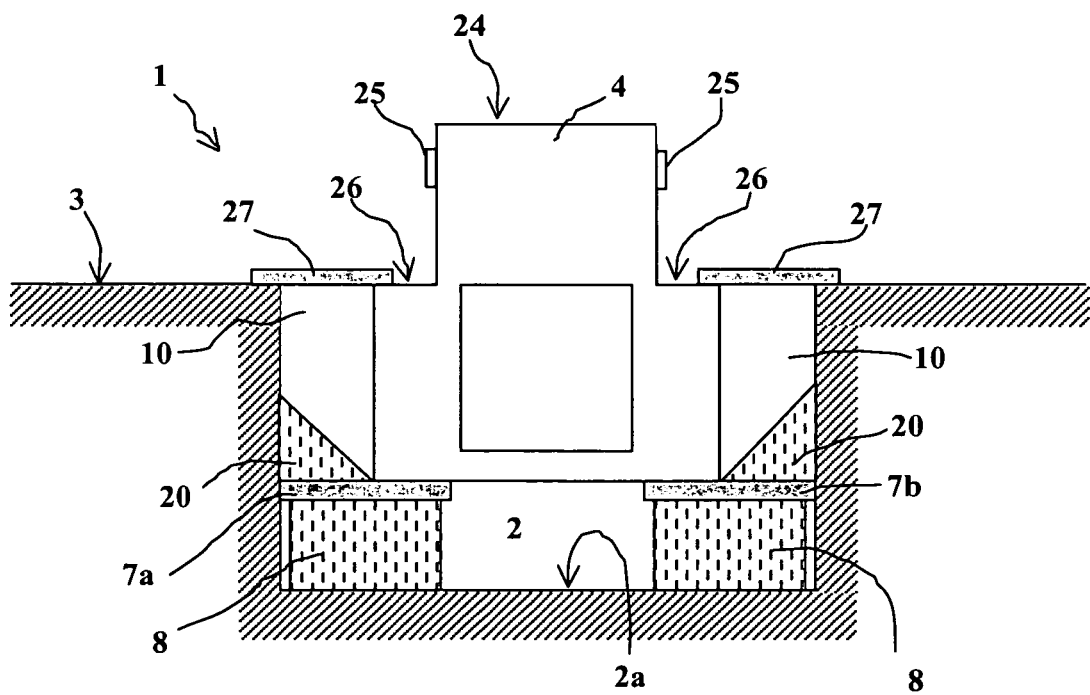
FIG. 6 is a view showing the implementation of the equipment according to the invention for the assembly of a vehicle positioned upside down.

FIG. 6 shows another example of the implementation of the assembly equipment according to the invention.

In the case of wheeled armored vehicles, it is necessary for a certain number of components to be mounted on the lower face 24 of the body of the vehicle 4. The axles 25 and wheels 5 (not shown in FIG. 6) must namely be mounted.

To facilitate this mounting operation, it is advantageous to perform the operation with the vehicle body 4 being positioned upside down.

In accordance with the invention, the vehicle 4 may be positioned upside down inside the pit 2. The blocks 8 will thus be selected of such dimensions that the offsets 26 at the bottom of the body are located substantially level with the workshop floor 3. It is thus easy to access the lower face 24 in order to perform the different mounting operations.

To cover the lateral gaps 10, the panels 27 may be positioned instead and in place of the shutters 9. Depending on the vehicle's dimensions 4, the shutters 9 may be enough to block up the gaps 10.

Naturally, the vehicle 4 is put into position upside down in the pit then removed from the pit using lifting means (hoist or bridge crane). The vehicle will then be turned over using lifting means before being reposition the right way up in another pit to continue being assembled.

In the whole of the preceding description, each floor platform 7a, 7b has been considered as an individual element (for example, made of sheet metal) whose vertical positioning was obtained by positioning means 8 such as wood blocks. It is naturally also possible for each floor platform 7a, 7b to be made in the form of pieces of wood and the floor platforms 7 and positioning means 8 may thus be very simply produced in the form of a stack of planks or stringers.

Figure 7:
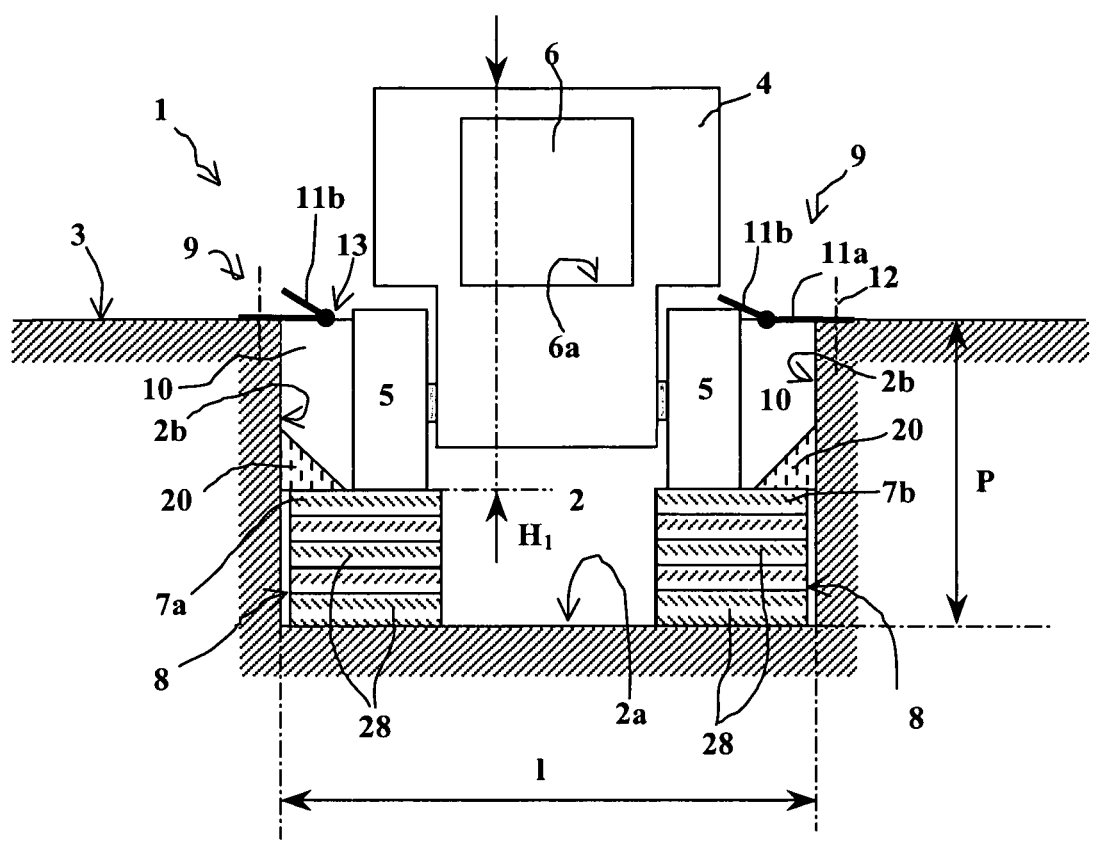
FIG. 7 is a view showing a variant embodiment of the positioning means for the vehicle.

By way of example, FIG. 7 is an analogous view to that in FIG. 1 but in which the vehicle 4 is positioned with respect to the bottom 2a of the pit 2 by means of a stack 8 of wooden planks or stringers 28. The stringers may be of identical or different thicknesses, the essential thing being to position the vehicle 4 at the required height. The top stringer 28 of each stack will thus constitute the floor platform 7a or 7b.

What is claimed is:

1. Assembly equipment for a large-sized vehicle with a height of two or more meters, the assembly equipment comprising:
    at least one pit able to accommodate the vehicle, wherein a top edge of the pit is level with a floor surrounding the pit;
    at least one floor platform, within the at least one pit, that is structured to raise the vehicle with respect to a bottom of the pit, wherein the at least one floor platform is removable and is structured so as to be positioned at various heights using at least one positioning device supporting the floor platform from below;
    at least one panel positioned on the top edge of the pit at an area of the pit corresponding to fore and/or rear regions of where the vehicle would be positioned within the pit, wherein the at least one panel partly covers the pit; and
    at least one lateral shutter enabling gaps between the vehicle and lateral edges of the pit to be closed off and/or revealed, wherein the at least one lateral shutter is positioned on the top edge of the pit, and is disposed at an intermediate height with respect to the vehicle.

2. The assembly equipment of claim 1, comprising at least two of said floor platforms separated from each other, wherein each of the at least two floor platforms are structured to be positioned so as to receive part of the mobility means of the vehicle.

3. The assembly equipment of claim 1, wherein the at least one floor platform and/or the at least one positioning device are constituted by at least one stack of stringers.

4. The assembly equipment according to claim 1, wherein said pit is of a length such that it is able to accommodate only one vehicle.

5. The assembly equipment of claim 1, further comprising at least one ramp accessibly connected to the pit, wherein the pit is of a length such that the pit is able to accommodate more than one vehicle, the at least one ramp constituting a pathway on which the vehicles are able to enter and/or exit the pit.

6. The assembly equipment of claim 1, wherein the at least one lateral shutter comprises a pivoting slat pivoting from a fixed slat, wherein the pivoting slat is able to press on the vehicle.

7. The assembly equipment of claim 1, the at least one positioning device comprising blocks of sufficient strength to support at least a weight of the floor platform and the vehicle.

8. The assembly equipment of claim 1, wherein the floor panels are configured to receive and support a top of the vehicle, such that the pit accommodates the vehicle in an upside-down position.

9. The assembly equipment of claim 1, wherein the at least one panel is disposed at an intermediate height with respect to the vehicle.

10. Assembly equipment for a large-sized vehicle with a height of two or more meters, the assembly equipment comprising:
    at least one pit able to accommodate the vehicle, wherein a top edge of the pit is level with a floor surrounding the pit;
    at least one floor platform, within the at least one pit, that is structured to raise the vehicle with respect to a bottom of the pit, wherein the at least one floor platform is removable and is structured so as to be positioned at various heights using at least one positioning device supporting the floor platform from below; and
    at least one lateral shutter enabling gaps between the vehicle and lateral edges of the pit to be closed off and/or revealed, wherein the at least one lateral shutter is positioned on the top edge of the pit, and is disposed at an intermediate height with respect to the vehicle, wherein the at least one lateral shutter comprises a pivoting slat pivoting from a fixed slat, wherein the pivoting slat is able to press on the vehicle.

11. The assembly equipment of claim 10, further comprising at least one panel positioned on the top edge of the pit at an area of the pit corresponding to fore and/or rear regions of where the vehicle would be positioned within the pit, wherein the at least one panel partly covers the pit.

12. The assembly equipment of claim 10, further comprising at least one ramp accessibly connected to the pit, wherein the pit is of a length such that the pit is able to accommodate more than one vehicle, the at least one ramp constituting a pathway on which the vehicles are able to enter and/or exit the pit.

13. The assembly equipment of claim 10, the at least one positioning device comprising blocks of sufficient strength to support at least a weight of the floor platform and the vehicle.

14. The assembly equipment of claim 10, comprising at least two of said floor platforms separated from each other, wherein each of the at least two floor platforms are structured to be positioned so as to receive part of the mobility means of the vehicle.

15. The assembly equipment of claim 10, wherein the at least one floor platform and/or the at least one positioning device are constituted by at least one stack of stringers.

* * * * *